(12) United States Patent
Patwardhan et al.

(10) Patent No.: US 8,515,919 B1
(45) Date of Patent: Aug. 20, 2013

(54) TECHNIQUES FOR OPTIMIZING DATA MIGRATION

(75) Inventors: Kedar Patwardhan, Pune (IN); Sanjay Kumar Jain, Pune (IN); Sushil Sarjerao Patil, Kolhapur (IN); Ramprasad Chinthekindi, Mumbai (IN); Neha Naik, Pune (IN)

(73) Assignee: Symantec Corporation, Mountain View, CA (US)

(*) Notice: Subject to any disclaimer, the term of this patent is extended or adjusted under 35 U.S.C. 154(b) by 131 days.

(21) Appl. No.: 13/106,919

(22) Filed: May 13, 2011

(51) Int. Cl.
*G06F 7/00* (2006.01)

(52) U.S. Cl.
USPC .......................................... 707/687

(58) Field of Classification Search
USPC ................ 707/687, 690, 703, 704; 711/161, 711/162; 709/214
See application file for complete search history.

(56) References Cited

U.S. PATENT DOCUMENTS

| 7,613,889 | B2* | 11/2009 | Stakutis et al. | 711/162 |
| 7,720,796 | B2* | 5/2010 | Wong et al. | 707/639 |
| 8,180,843 | B2* | 5/2012 | Wong et al. | 709/214 |
| 2005/0278492 | A1* | 12/2005 | Stakutis et al. | 711/161 |
| 2008/0114854 | A1* | 5/2008 | Wong et al. | 709/214 |
| 2010/0274826 | A1* | 10/2010 | Takata et al. | 707/812 |

* cited by examiner

*Primary Examiner* — Hung T Vy
(74) *Attorney, Agent, or Firm* — Wilmer Cutler Pickering Hale and Dorr LLP

(57) ABSTRACT

Techniques for optimizing data migration are disclosed. In one particular embodiment, the techniques may be realized as a method for optimizing data migration may comprise receiving a request for initiating a data migration application and migrating, via at least one computer processor, at least one data file from a migration list during the data migration application. The method for optimizing data migration may also comprise monitoring the migration of the at least one data file and determining whether the at least one data file is active during the migration of the at least one data file. The method for optimizing data migration may further comprise deferring the migration of the at least one data file based at least in part on a determination that the at least one data file is active and recording information associated with the at least one data file if the at least one data file is active.

20 Claims, 4 Drawing Sheets

TECHNIQUES FOR OPTIMIZING DATA MIGRATION

FIELD OF THE DISCLOSURE

The present disclosure relates generally to data migration and, more particularly, to techniques for optimizing data migration.

BACKGROUND OF THE DISCLOSURE

Data migration relates to the process of transferring data between storage types, formats, and/or devices. Data migration may be accomplished by mapping data on a source system to a target system. After loading data from the source system to the target system, results are subjected to data verification to determine whether data was accurately mapped from the source system to the target system. During data migration, file access may get serialized between the source system and the target system. Also, during data migration, files may be accessed by other applications when migrated from the source system to the target system. If any changes are made to the files by other applications, many file system operations may be needed to be performed on the source system and the target system. Thus, data migration processes may be inefficient and time-consuming.

In view of the foregoing, it may be understood that there may be significant problems and shortcomings associated with current techniques for data migration.

SUMMARY OF THE DISCLOSURE

Techniques for optimizing data migration are disclosed. In one particular embodiment, the techniques may be realized as a method for optimizing data migration may comprise receiving a request for initiating a data migration application and migrating, via at least one computer processor, at least one data file from a migration list during the data migration application. The method for optimizing data migration may also comprise monitoring the migration of the at least one data file and determining whether the at least one data file is active during the migration of the at least one data file. The method for optimizing data migration may further comprise deferring the migration of the at least one data file based at least in part on a determination that the at least one data file is active and recording information associated with the at least one data file if the at least one data file is active.

In accordance with other aspects of this particular exemplary embodiment, the request for initiating the data migration application may comprise at least one of user information, data information, migration information, source system information, target system information, server information, server location, database information, network information, network connection, operating environment information, and directory information.

In accordance with further aspects of this particular exemplary embodiment, the migration list may be generated based at least in part on the request for initiating the data migration application.

In accordance with additional aspects of this particular exemplary embodiment, monitoring the migration of the at least one data file may comprise monitoring a reference identifier associated with the at least one data files.

In accordance with yet another aspect of this particular exemplary embodiment, the reference identifier may comprise a reference counter.

In accordance with still another aspect of this particular exemplary embodiment, the reference count may be incremented based at least in part on a number of applications accessing the at least one data file.

In accordance with other aspects of this particular exemplary embodiment, determining whether the at least one data file is active may be based at least in part on the reference counter.

In accordance with further aspects of this particular exemplary embodiment, the information associated with the at least one active data file may be recorded in a deferred list.

In accordance with additional aspects of this particular exemplary embodiment, the method may further comprise determining whether the data migration application is complete by accessing the migration list.

In accordance with yet another aspect of this particular exemplary embodiment, the method may further comprise migrating the at least one active data file based at least in part on a determination that the data migration application is complete.

In accordance with still another aspect of this particular exemplary embodiment, the method may further comprise determining whether one or more new data files are created during the data migration application.

In accordance with other aspects of this particular exemplary embodiment, the method may further comprise deferring a migration of the one or more new data file.

In accordance with further aspects of this particular exemplary embodiment, the method may further comprise recording information associated with the one or more new data file in a deferred list.

In another particular embodiment, the technique(s) may be realized as a system for optimizing data migration and the system may comprise at least one processor configured to: receive a request for initiating a data migration application and migrate at least one data file from a migration list during the data migration application. The at least one processor may be also configured to monitor the migration of the at least one data file and determine whether the at least one data file is active during the migration of the at least one data file. The at least one processor may be further configured to defer the migration of the at least one data file based at least in part on a determination that the at least one data file is active; and record information associated with the at least one data file if the at least one data file is active. The system may also comprise at least one memory, coupled to the at least one processor, configured to provide the at least one processor with instructions.

In another particular embodiment, the technique(s) may be realized as a system for optimizing data migration comprising an interface module configured to receive a request for initiating a data migration application and a migration module comprising at least one computer processor configured to migrate at least one data file from a migration list during the data migration application. The system for optimizing data migration may also comprise a monitoring module configured to monitor the migration of the at least one data file, determine whether the at least one data file is active during the migration of the at least one data file, and defer a migration of the at least one data file based at least in part on a determination that the at least one data file is active, and a deferred list module configured to store information associated with the at least one data file if the at least one data file is active.

In accordance with other aspects of this particular exemplary embodiment, the monitoring module may be further configured to monitor a reference identifier associated with the at least one data files.

In accordance with further aspects of this particular exemplary embodiment, the reference identifier may comprise a reference counter.

In accordance with additional aspects of this particular exemplary embodiment, the reference count may be incremented based at least in part on a number of applications accessing the at least one data file.

In accordance with yet another aspect of this particular exemplary embodiment, the monitoring module may be configured to determine whether the at least one data file is active is based at least in part on the reference counter.

In accordance with still another aspect of this particular exemplary embodiment, the migration module may be further configured to migrate the at least one active data file based at least in part on a determination that the data migration application is complete.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
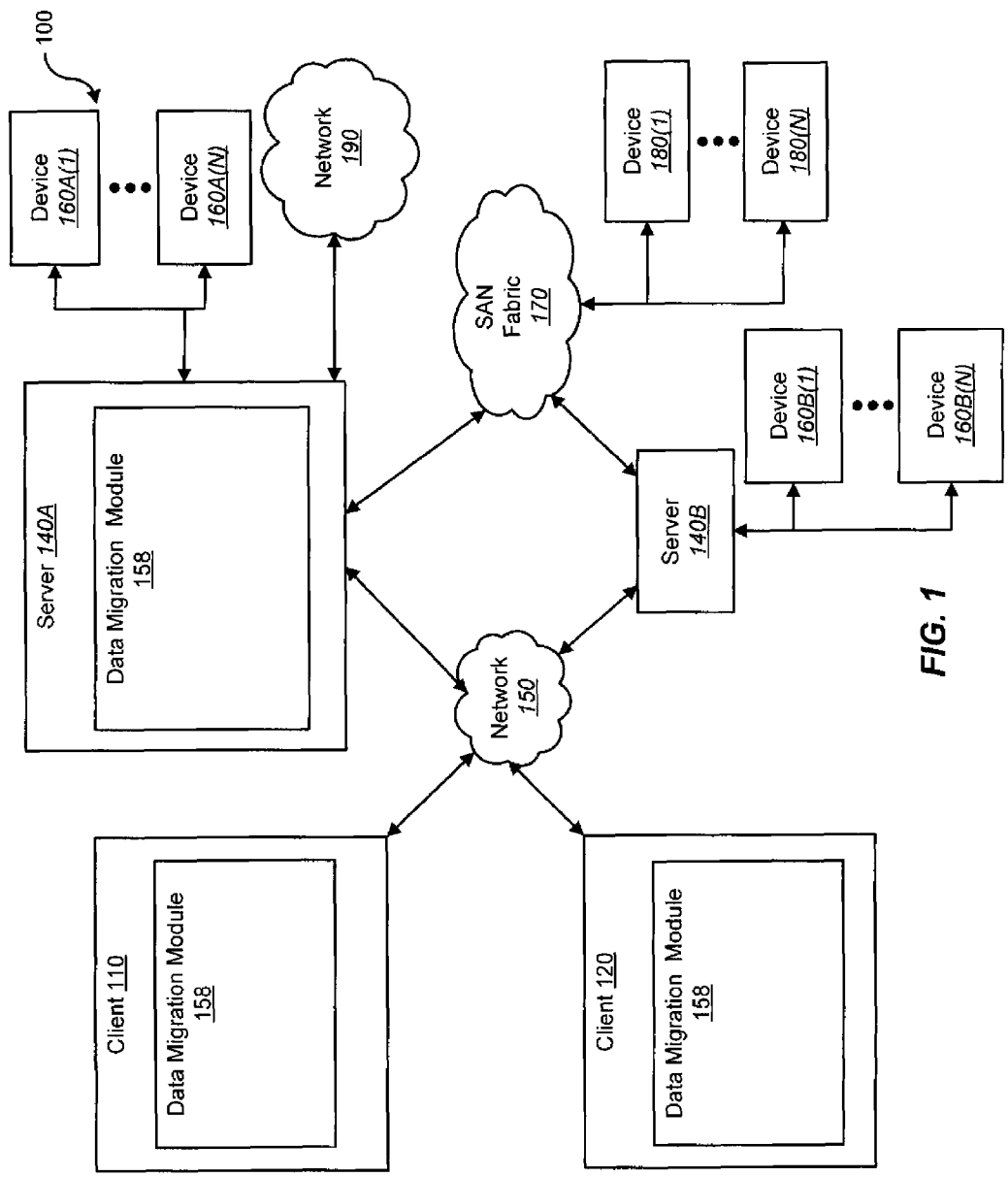
FIG. 1 shows a block diagram depicting a network architecture for optimizing data migration in accordance with an embodiment of the present disclosure.

FIG. 1 shows a block diagram depicting a network architecture 100 for optimizing data migration in accordance with an embodiment of the present disclosure. FIG. 1 is a simplified view of network architecture 100, which may include additional elements that are not depicted. Network architecture 100 may contain clients 110-120 and servers 140A and 140B (one or more of which may be implemented using computer system 200 shown in FIG. 2). Clients 110-120 may be communicatively coupled to a network 150. Server 140A may be communicatively coupled to networks 190 and 150. Server 140B may be communicatively coupled to storage devices 160A(1)-(N). Server 140B may be communicatively coupled to a SAN (Storage Area Network) fabric 170. SAN fabric 170 may support access to storage devices 180(1)-(N) by server 140B, and by network element 110 via network 150.

The description below describes network elements, computers, and/or components of a system and method for optimizing data migration that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Servers 140A and 140B may be communicatively coupled to a SAN (Storage Area Network) fabric 170. SAN fabric 170 may support access to storage devices 180(1)-(N) by servers 140A and 140B, and by client 110 via network 150. Server 140A may be communicatively coupled to network 190. According to some embodiments, server 140A may be a proxy server, a datacenter, and/or other network device capable of optimizing data migration. Server 140A may be communicatively coupled to network 190.

Server 140A may comprise a data migration module 158 for optimizing data migration. For example, the data migration module 158 may be capable of creating a deferred list of active files or newly created files during data migration. In an exemplary embodiment, the data migration module 158 may monitor transferring of files during data migration. When a file is active (e.g., in use or accessed by other applications) during a data migration, the data migration module 158 may defer transferring of the file to a target system (e.g., client 110 or client 120) at a later time and add the file identification to the deferred list. When a file is created during a data migration, the data migration module 158 may defer transferring the newly created file to a target system (e.g., client 110 or client 120) while the newly created file is created on a source system (e.g., server 140A). The newly created file identification may be added to the deferred list to be transferred at a later time. Thus, the data migration module 158 may achieve optimization of data migration by reducing an amount of down-time and a number of system operations performed. After the completion of the data migration, the data migration module 158 may access the deferred list to verify whether one or more files have not been transferred. If one or more files are listed in the deferred list, the data migration module 158 may transfer the one or more files listed in the deferred list.

The clients 110-120 may be communicatively coupled to the server 140A via the network 150. For example, the clients 110-120 may comprise similar modules (e.g., data migration module 158) as the server 140A in order to optimizing data migration. Data migration may be accomplished between client 110 and client 120. Data migration may be also accomplished between clients 110-120 and server 140A.

Figure 2:
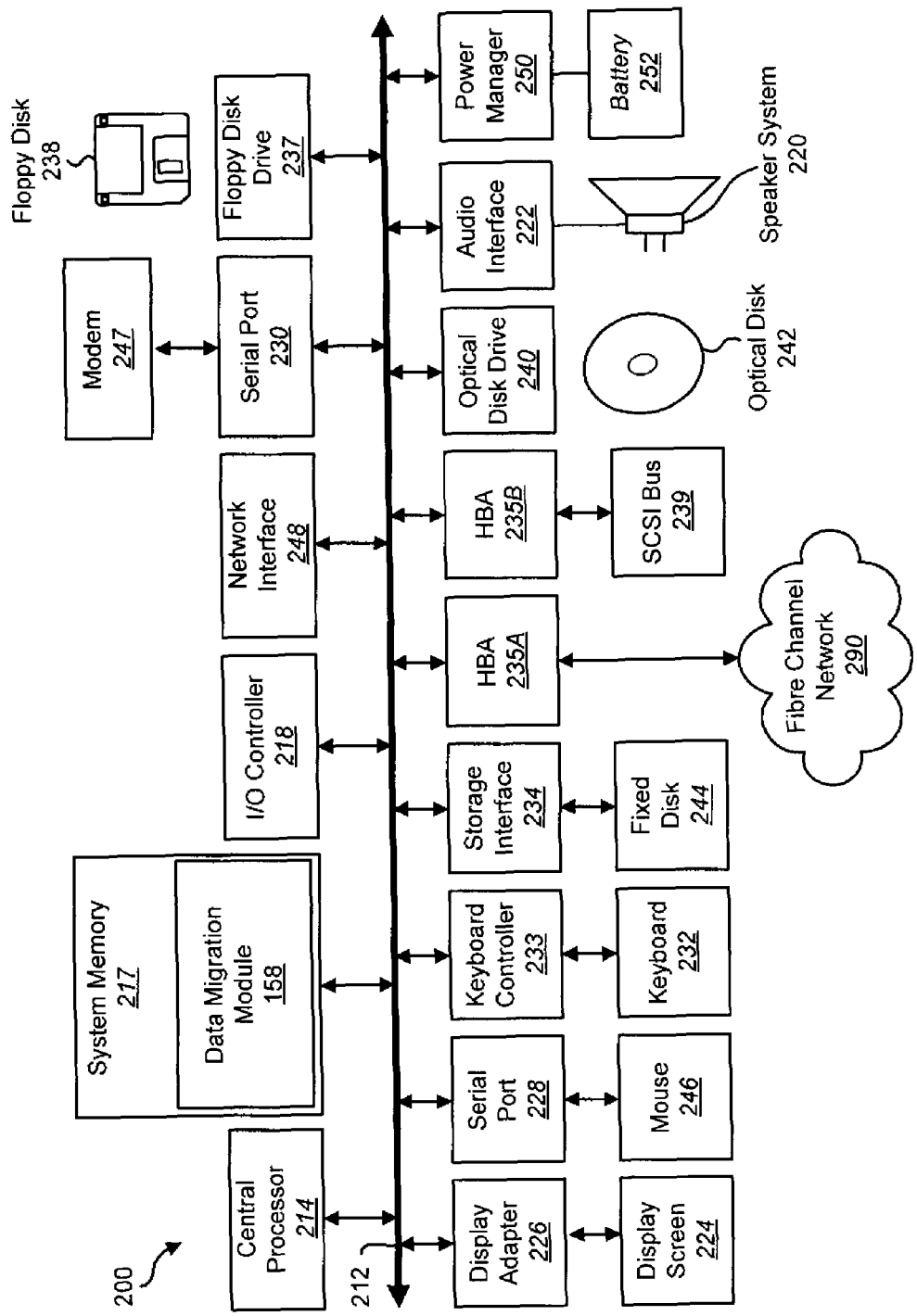
FIG. 2 depicts a block diagram of a computer system in accordance with an embodiment of the present disclosure.

With reference to computer system 200 of FIG. 2, modem 247, network interface 248, or some other method may be used to provide connectivity from of clients 110-120 to network 150. Clients 110-120 may be able to access information on server 140A or 140B using, for example, a web browser or other client software. Such a client software may allow clients 110-120 to access data hosted by servers 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110-120, servers 140A and 140B, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients 110-120 or servers 140A and 140B to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B (1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110-120 may be a smartphone, PDA, desktop computer, a laptop computer, a server, another computer, or another device coupled via a wireless or wired connection to network 150. Clients 110-120 may receive data from user input, a database, a file, a web service, and/or an application programming interface. According to some embodiments, clients 110-120 may be a mobile client such as, for example, a smart phone. Clients 110-120 may comprise data migration module 158 (e.g., similar to the data migration module 158 in the server 140A) in order optimizing data migration.

Servers 140A and 140B may be application servers, archival platforms, virtualization environment platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110-120 and a backup platform, a backup process, and/or storage. According to some embodiments, servers 140A and 140B may be platforms used for backing up, archiving, and/or migrating data.

FIG. 2 depicts a block diagram of a computer system 200 in accordance with an embodiment of the present disclosure. Computer system 200 is suitable for implementing techniques for optimizing data migration in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via an non-transitory computer readable medium, such as a hard disk drive (e.g., fixed disk 244), an optical drive (e.g., optical drive 240), a floppy disk unit 237, or other storage medium. For example, data migration module 158 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in an non-transitory computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
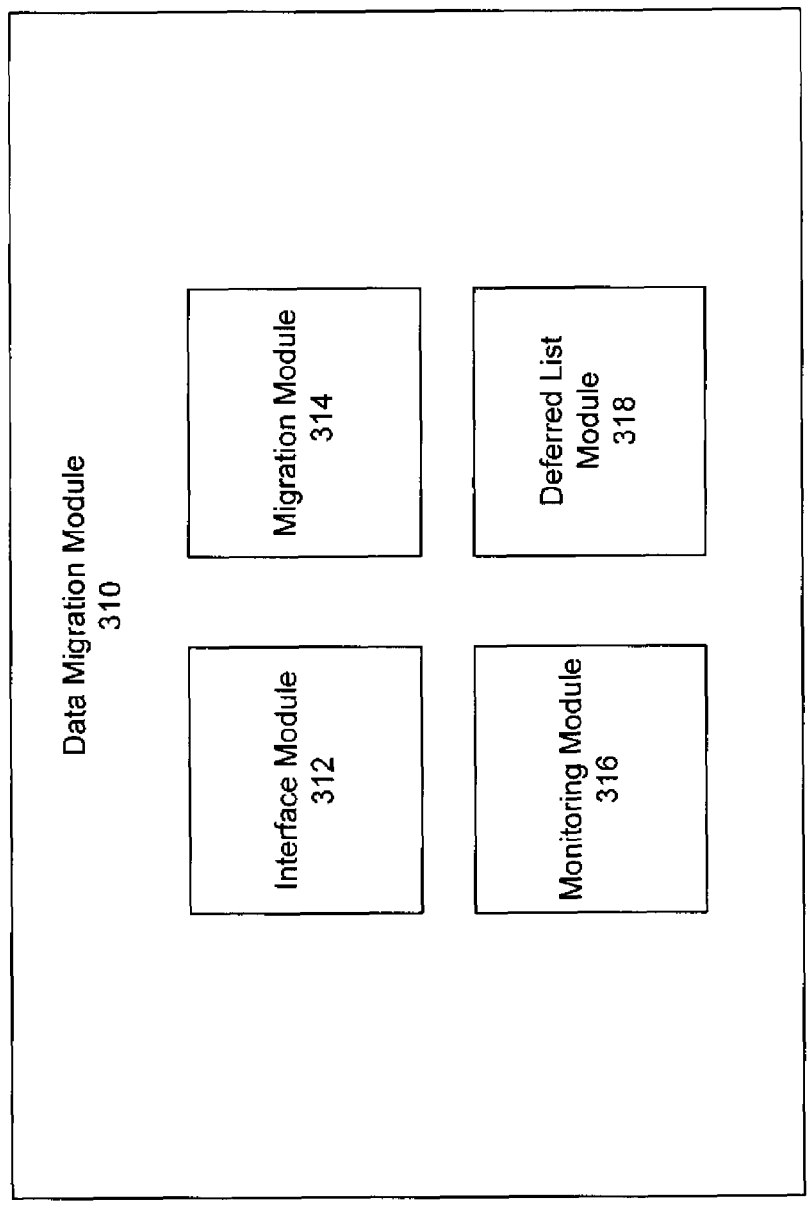
FIG. 3 shows a data migration module in accordance with an embodiment of the present disclosure.

Referring to FIG. 3, there is shown a data migration module 310 in accordance with an embodiment of the present disclosure. As illustrated, the data migration module 310 may contain one or more components including an interface module 312, a migration module 314, a monitoring module 316, and/or a deferred list module 318.

The interface module 312 may comprise at least one processor to provide an interface between users and the data migration module 310. The interface module 312 may include a user interface, e.g., a graphical user interface, to receive one or more queries/requests from the user. The interface module 312 may provide a separate or a unified graphical user interface. The interface module 312 may include an Application Programming Interface (API) to interact with the user of the data migration module 310 in order to optimize data migration. In an exemplary embodiment, the interface module 312 may present one or more input requests or displays to the user of the data migration module 310. For example, the interface module 312 may provide input requests to the user for user information, data information, migration information, source system information, target system information, server information, server location, database information, network information, network connection, operating environment information, directory information, or other requests for information to optimize data migration.

The interface module 312 may receive one or more queries/requests from the user to migrate data from a source system (e.g., client 110) to a target system (e.g., client 120). For example, a user may input a request to the interface module 312 to migrate data selected by the user. In another exemplary embodiment, a user may input a request to the interface module 312 to periodically migrate data from a source system to a target system. The user request may include data identification information, source system information, target system information, time information, network information, and/or other information for optimizing data migration.

The migration module 314 may comprise at least one processor, transmission device, and/or reception device for optimizing data migration from a source system (e.g., client 110) to a target system (e.g., client 120). The migration module 314 may access selected data for the data migration. The migration module 314 may create a migration list of data files selected for data migration. In an exemplary embodiment, data may be stored in a hierarchical tree structure with a set of linked nodes. Each of the hierarchical data tree structure may contain a value, a condition, and/or a data structure. The migration module 314 may migrate data by traversing the hierarchical data tree structure (e.g., tree-traversal). The migration module 314 may traverse each node of the hierarchical data tree structure in order to complete the data migration.

During the data migration, the monitoring module 316 may monitor the data migration process. The monitoring module 316 may monitor the data migration process by monitoring a reference identifier associated with the data files for data migration. In an exemplary embodiment, a reference identifier associated with the data files for data migration may comprise a reference counter. The reference counter may be configured to have a default value of zero, when no application is accessing the data file. The reference counter may increment based at least in part on a number of applications accessing the data file. For example, the reference counter may increment by one when one application is accessing the data file and the reference counter may increment by two when two applications are accessing the data file, etc.

The monitoring module 316 may comprise at least one processor to monitor and/or determine whether one or more data files for data migration are active (e.g., in use or being accessed by other applications) during the data migration. The monitoring module 316 may monitor a reference identifier associated with the data files for data migration in order to determine whether the data files are active or newly created. In an exemplary embodiment, when one or more data files for data migration are not active, the reference counter may be zero. The monitoring module 316 may determine that the one or more data files for data migration are inactive when the reference counter is zero. In another exemplary embodiment, when one or more data files for data migration are active, the reference counter may be incremented to one. The monitoring module 316 may determine that the one or more data files for data migration are active when the reference counter is one. In other exemplary embodiments, during data migration, the reference counter may be incremented to one because data migration application is accessing the one or more data files. Another application may access (e.g., become active) one or more data files during the migration (e.g., transfer) of the one or more data files, and the reference identifier may be incremented to two. Thus, the monitoring module 316 may determine that the one or more data files for data migration are active when the reference counter is incremented to two.

The monitoring module 316 may monitor one or more new data files created during the data migration. For example, one or more new data files may be created during data migration to be included in the data migration. The monitoring module 316 may monitor for one or more new data files created during the data migration.

When the monitoring module 316 determines that one or more data files are active or new during data migration, the migration module 314 may defer the transfer of one or more active or new data files during the data migration. The monitoring module 316 may record information associated with the one or more active or new data files to the deferred list module 318. The information associated with the one or more active or new data files may comprise file name, file date, file location, file usage, metadata, and/or other information for identifying the one or more active or new data files. The deferred list module 318 may store the information associated with the one or more active or new data files in a predetermined format. For example, the deferred list module 318 may store the information associated with the one or more active or new data files in a hierarchical tree structure, tree chart, flow chart, pedigree chart, and/or other predetermined format.

After completion of the data migration (e.g., transferring of inactive data files), the migration module 314 may access the deferred list module 318 to determine whether one or more data files are active or newly created during the data migration. When the one or more data files are recorded in the deferred list module 318, the migration module 314 may migrate the data file recorded in the deferred list module 318. The migration module 314 may migrate (e.g., transfer) the one or more data files recorded in the deferred list module 318, even when the one or more data files are still active.

Figure 4:
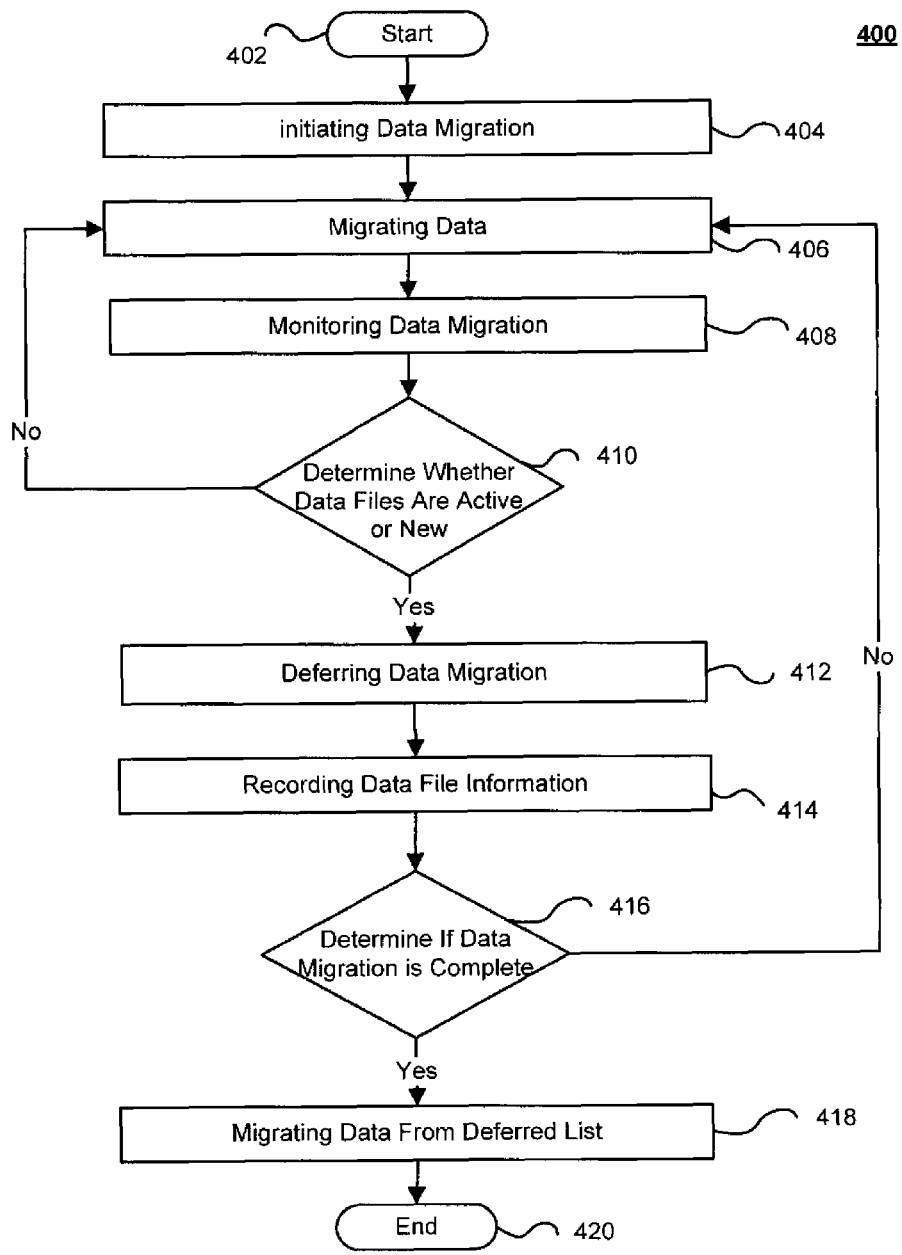
FIG. 4 depicts a method for optimizing data migration in accordance with an embodiment of the present disclosure.

Referring to FIG. 4, there is depicted a method 400 for optimizing data migration in accordance with an embodiment of the present disclosure. At block 402, the method 400 may begin.

At block 404, a user may initiate a data migration from a source system (e.g., the client 110) to a target system (e.g., the client 120). For example, an interface module 312 may receive a request from a user to initiate a data migration. For example, a user may input a request to the interface module 312 to migrate data comprises one or more data files selected by the user. The user request may include data identification information, source system information, target system information, time information, network information, and/or other information for optimizing data migration.

At block 406, data may be migrated from the source system (e.g., client 110) to the target system (e.g., client 120). The migration module 314 may access selected data for the data migration. The migration module 314 may create a migration list comprising a list of data files to be migrated during the data migration. The migration module 314 may generate the migration list based at least in part on the request to initiate a data migration. In an exemplary embodiment, data may be stored in a hierarchical tree structure with a set of linked nodes. Each of the hierarchical data tree structure may contain a value, a condition, and/or a data structure. The migration module 314 may migrate data by traversing the hierarchical data tree structure (e.g., tree-traversal). The migration module 314 may traverse each node of the hierarchical data tree structure in order to complete the data migration.

At block 408, data migration may be monitored. The monitoring module 316 may monitor the data migration process. The monitoring module 316 may monitor the data migration process by monitoring a reference identifier associated with the data files for data migration. In an exemplary embodiment, a reference identifier associated with the data files for data migration may comprise a reference counter. The reference counter may be configured to have a default value of zero, when no application is accessing the data file. The reference counter may increment based at least in part on a number of applications accessing the data file. The monitoring module 316 may monitor the reference counter in order to determine a number of applications accessing the data files for data migration.

At block 410, the monitoring module 316 may determine whether one or more data files are active or newly created during data migration. The monitoring module 316 may monitor a reference identifier associated with the data files for data migration in order to determine whether the data files are active or newly created. In an exemplary embodiment, when one or more data files for data migration are not active, the reference counter may be zero. The monitoring module 316 may determine that the one or more data files for data migration are inactive when the reference counter is zero. In another exemplary embodiment, when one or more data files for data migration are active, the reference counter may be incremented to one. The monitoring module 316 may determine that the one or more data files for data migration are active when the reference counter is one. In other exemplary embodiments, during data migration, the reference counter may be incremented to one because the data migration application is accessing the one or more data files. Another application may access (e.g., become active) one or more data files during the migration (e.g., transfer) of the one or more data files, and the reference identifier may be incremented to two. Thus, the monitoring module 316 may determine that the one or more data files for data migration are active when the reference counter is incremented to two.

The monitoring module 316 may monitor one or more new data files created during the data migration. For example, one or more new data files may be created during data migration to be included in the data migration. The monitoring module 316 may monitor for one or more new data files created during the data migration.

The monitoring module 316 may determine that one or more data files are inactive, the data migration method 400 may return to block 406 and transfer the one or more data files. In another exemplary embodiment, the monitoring module 316 may determine that one or more data files are active, the data migration method 400 may proceed to block 412.

At block 412, the one or more active or newly created data files are deferred from data migration. For example, the migration module 312 may not transfer the one or more active or newly created data files and defer the transfer of the one or more active or newly created data files at a later time.

At block 414, information associated with the one or more active or newly created data files may be recorded. For example, the monitoring module 316 may record information associated with the one or more active or newly created data files to the deferred list module 318. The information associated with the one or more active or newly created data files may comprise file name, file date, file location, file usage, metadata, and/or other information for identifying the one or more active or newly created data files. The deferred list module 318 may store the information associated with the one or more active or newly created data files in a predetermined format. For example, the deferred list module 318 may store the information associated with the one or more active or newly created data files in a hierarchical tree structure, tree chart, flow chart, pedigree chart, and/or other predetermined format.

At block 416, the migration module 314 may determine whether the data migration is completed. For example, the migration module 314 may continue to migrate data files listed in the migration list. The migration module 314 may continue to migrate data files until all the data files listed in the migration list are processed (e.g., transferred or deferred). If the one or more data files remain in the migration list, the data migration method 400 may proceed to block 406 to migrate the data files remained on the migration list. If no more data files remain in the migration list, the data migration method 400 may proceed to block 418.

At block 418, data files from the deferred list may be migrated. For example, the migration module 314 may access the deferred list module 318 to determine whether one or more data files are recorded in the deferred list module 318. In an exemplary embodiment, the migration module 314 may determine that one or more data files are recorded in the deferred list module 318. The migration module 314 may migrate the data file recorded in the deferred list module 318, as described above with reference to block 406. The migration module 314 may migrate the data file recorded in the deferred list module 318 even if the data file is active.

At block 420, the method 400 may end.

At this point it should be noted that optimizing data migration in accordance with the present disclosure as described above typically involves the processing of input data and the generation of output data to some extent. This input data processing and output data generation may be implemented in hardware or software. For example, specific electronic components may be employed in a data migration module or similar or related circuitry for implementing the functions associated with optimizing data migration in accordance with the present disclosure as described above. Alternatively, one or more processors operating in accordance with instructions may implement the functions associated with optimizing data migration in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for optimizing data migration comprising:
    receiving a request for initiating a data migration application;
    migrating, via at least one computer processor, at least one existing data file from a migration list during the data migration application;
    monitoring the migration of the at least one existing data file;
    determining whether the at least one existing data file is active during the migration of the at least one existing data file;
    determining whether at least one new data file is created during the data migration application;
    deferring the migration of the at least one new data file and of the at least one active existing data file; and
    recording information associated with the at least one new data file and the at least one active existing data file.

2. The method of claim 1, wherein the request for initiating the data migration application comprises at least one of user information, data information, migration information, source system information, target system information, server information, server location, database information, network information, network connection, operating environment information, and directory information.

3. The method of claim 1, wherein the migration list is generated based at least in part on the request for initiating the data migration application.

4. The method of claim 1, wherein monitoring the migration of the at least one existing data file comprises monitoring a reference identifier associated with the at least one existing data file.

5. The method of claim 4, wherein the reference identifier comprises a reference counter.

6. The method of claim 5, wherein the reference counter is incremented based at least in part on a number of applications accessing the at least one existing data file.

7. The method of claim 5, wherein determining whether the at least one existing data file is active is based at least in part on the reference counter.

8. The method of claim 1, further comprising recording information associated with the at least one active existing data file in a deferred list.

9. The method of claim 8, further comprising determining whether the data migration application is complete by accessing the migration list.

10. The method of claim 9, further comprising migrating the at least one active existing data file based at least in part on a determination that the data migration application is complete.

11. The method of claim 1, further comprising migrating the at least one new data file based at least in part on a determination that the data migration application is complete.

12. The method of claim 1, further comprising deferring a migration of the at least one new data file.

13. The method of claim 12, further comprising recording information associated with the at least one new data file in a deferred list.

14. A system for optimizing data migration, the system comprising:
    at least one processor configured to:
        receive a request for initiating a data migration application;
        migrate at least one existing data file from a migration list during the data migration application;
        monitor the migration of the at least one existing data file;
        determine whether the at least one existing data file is active during the migration of the at least one existing data file;
        determining whether at least one new data file is created during the data migration application;
        defer the migration of the at least one new data file and of the at least one active existing data file; and
        record information associated with the at least one new data file and the at least one active existing data file; and
    at least one memory, coupled to the at least one processor, configured to provide the at least one processor with instructions.

15. A system for optimizing data migration comprising:
    one or more processors communicatively coupled to a network; wherein the one or more processors are configured to:
        receive a request for initiating a data migration application;
        migrate at least one existing data file from a migration list during the data migration application;
        monitor the migration of the at least one existing data file;
        determine whether the at least one existing data file is active during the migration of the at least one existing data file;
        determine whether at least one new data file is created during the data migration application;
        defer a migration of the at least one new data file and of the at least one active existing data file; and
        store information associated with the at least one new data file and the at least one active existing data file.

16. The system of claim 15, wherein the one or more processors are further configured to monitor a reference identifier associated with the at least one existing data file.

17. The system of claim 16, wherein the reference identifier comprises a reference counter.

18. The system of claim 17, wherein the reference counter is incremented based at least in part on a number of applications accessing the at least one existing data file.

19. The system of claim 17, wherein the one or more processors are further configured to determine whether the at least one existing data file is active is based at least in part on the reference counter.

20. The system of claim 16, wherein the one or more processors are further configured to migrate the at least one active existing data file based at least in part on a determination that the data migration application is complete.

\* \* \* \* \*